United States Patent
Kwak

[11] Patent Number: 6,144,393
[45] Date of Patent: Nov. 7, 2000

[54] IMAGE FORMING APPARATUS HAVING SCAN POSITION CORRECTION

[75] Inventor: Hee-kook Kwak, Suwon, Rep. of Korea

[73] Assignee: Samsung Electronics Co., Ltd., Kyungki-do, Rep. of Korea

[21] Appl. No.: 09/107,287

[22] Filed: Jun. 30, 1998

[30] Foreign Application Priority Data

Jul. 18, 1997 [KR] Rep. of Korea .................. 97-33544

[51] Int. Cl.[7] .................. B41J 2/385; G01D 15/06; G03G 15/01
[52] U.S. Cl. .................. 347/116; 347/132; 399/301
[58] Field of Search .................. 347/116, 234, 347/235, 248, 256, 132, 133, 229, 250; 399/301, 388, 394, 15, 31, 32, 51, 177

[56] References Cited

U.S. PATENT DOCUMENTS

| | | | |
|---|---|---|---|
| 5,278,587 | 1/1994 | Strauch et al. | 347/133 X |
| 5,319,537 | 6/1994 | Powers et al. | 347/116 X |
| 5,452,073 | 9/1995 | Kataoka | 347/116 |
| 5,627,649 | 5/1997 | Sawayama et al. | 347/116 |

FOREIGN PATENT DOCUMENTS

| | | |
|---|---|---|
| 6-83179 | 3/1994 | Japan . |
| 8-115035 | 5/1996 | Japan . |

*Primary Examiner*—Sandra Brase
*Attorney, Agent, or Firm*—Sughrue, Mion, Zinn, Macpeak & Seas, PLLC

[57] ABSTRACT

An image forming apparatus includes an exposing unit for performing exposure by scanning a beam to a photosensitive belt to form an electrostatic latent image, a developing unit for forming a toner image by supplying liquid toner to the electrostatic latent image formed by the exposing unit, a sensor for detecting the position of the toner image formed on the photosensitive belt, and a controller for calculating a positional error by comparing the position detected by the sensor with an established reference position and controlling exposure performed by the exposing unit to correct the calculated positional error. Thus, since errors between the established scanning position and the actual scanning position are automatically corrected during scanning, the scanning can be performed more precisely and conveniently.

6 Claims, 4 Drawing Sheets

IMAGE FORMING APPARATUS HAVING SCAN POSITION CORRECTION

BACKGROUND OF THE INVENTION

1. Field of the Invention

The present invention relates to an image forming apparatus, and more particularly, to an image forming apparatus in which the position of scan is automatically corrected.

The present application is based upon Korean Application No. 97-33544, which is incorporated herein by reference.

2. Description of the Related Art

An image forming apparatus reproduces text or images on a recording medium according to text or image data signals. The image forming apparatus includes a photosensitive member, such as a photosensitive drum or photosensitive belt for forming an electrostatic latent image on a recording medium, a charging unit for charging the photosensitive member, an exposing unit for forming the electrostatic latent image by emitting light to the charged photosensitive member, a developing unit for forming a toner image by supplying a developer, such as a liquid toner, to the electrostatic latent image formed on the photosensitive member, and a transferring unit for transferring the toner image to the recording medium by heating and pressing the same.

FIG. 1 schematically shows the configuration of a conventional image forming apparatus having the above structure. Referring to FIG. 1, the conventional image forming apparatus includes a circulating photosensitive belt 100, onto which an electrostatic latent image is exposed by an exposing unit 110 and a toner image is developed by a developing unit 120. The exposing unit 110 is composed of laser scanning units (LSU) 110a, 110b, 110c, and 110d for each color. Of the LSUs, a Y-LSU 110a is an LSU for yellow, an M-LSU 110b is an LSU for magenta, a C-LSU 110c is an LSU for cyan, and a BK-LSU 110d is an LSU for black, The developing unit 120, having developing units 120a, 120b, 120c, and 120d for each color, performs development by applying a liquid toner on the electrostatic latent image formed by the exposing unit 110. When a toner image is formed on the photosensitive belt 100 by the developing unit 120, the image is printed on a print paper 150 by a transfer roller 130 and a heated press roller 140.

However, when scanning is performed by the respective LSUs 110a, 110b, 110c, and 110d for each color in the above image forming apparatus, misregistration occurs unless distances $l_1$, $l_2$ and $l_3$ between each scanning position are equal. Thus, an initialization operation is performed to equalize the distances $l_1$, $l_2$ and $l_3$ between the respective scanning positions on the photosensitive belt 100 of the image forming apparatus.

According to the conventional technology, in order to set the distances $l_1$, $l_2$ and $l_3$ between the respective scanning positions on the photosensitive belt 100 to be equal, a test print is first performed and then an error is calculated by manually measuring the scanning positions for each color based on the printed image. Next, a lookup table is made with data of the generated errors and stored in a memory so that the scanning positions for each color are designated based on the stored data. However, since the initialization operation for the equalization of the distances between the scanning positions for each color is manually done in the conventional image forming apparatus, the initialization operation is performed inaccurately and takes a rather long time. Further, it is inconvenient to repeat such operation whenever the exposing unit is replaced.

SUMMARY OF THE INVENTION

To solve the above problems, it is an objective of the present invention to provide an image forming apparatus in which errors of scanning positions for each color on a photosensitive belt can be automatically corrected.

Accordingly, to achieve the above objective, there is provided an image forming apparatus, comprising: an exposing unit for performing exposure by scanning a beam to a photosensitive belt to form an electrostatic latent image; a developing unit for forming a toner image by supplying liquid toner to the electrostatic latent image formed by the exposing unit; a sensor for detecting the position of the toner image formed on the photosensitive belt; and a controller for calculating a positional error by comparing the position detected by the sensor with an established reference position and controlling exposure performed by the exposing unit to correct the calculated positional error.

It is preferable in the present invention that the sensor detects the distance between an initial position of an image area on the photosensitive belt and the position of the toner image and the distance between an initial position of the print paper and the position of the image printed on a print paper.

It is also preferable in the present invention that the controller comprises a storing device for storing data of the positional error, and a processor for calculating the positional error and inputting the calculated positional error to the storing device, generating a control signal to output the positional error during printing, and generating a control signal to perform exposure in which the positional error is corrected to the exposing unit.

In addition, it is preferable in the present invention that the storing device is an EEPROM.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
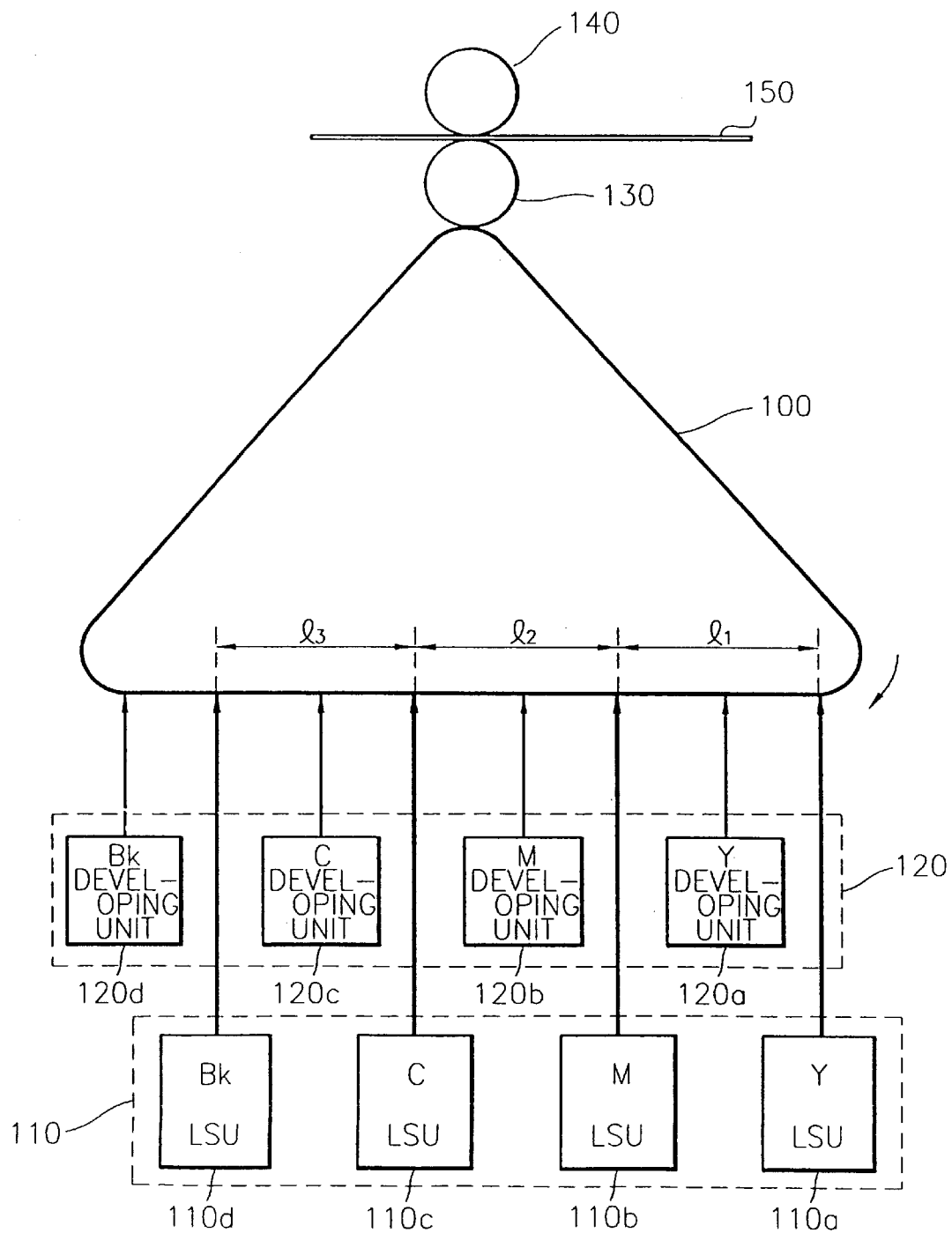
FIG. 1 is a diagram showing the configuration of a conventional image forming apparatus.
Figure 2:
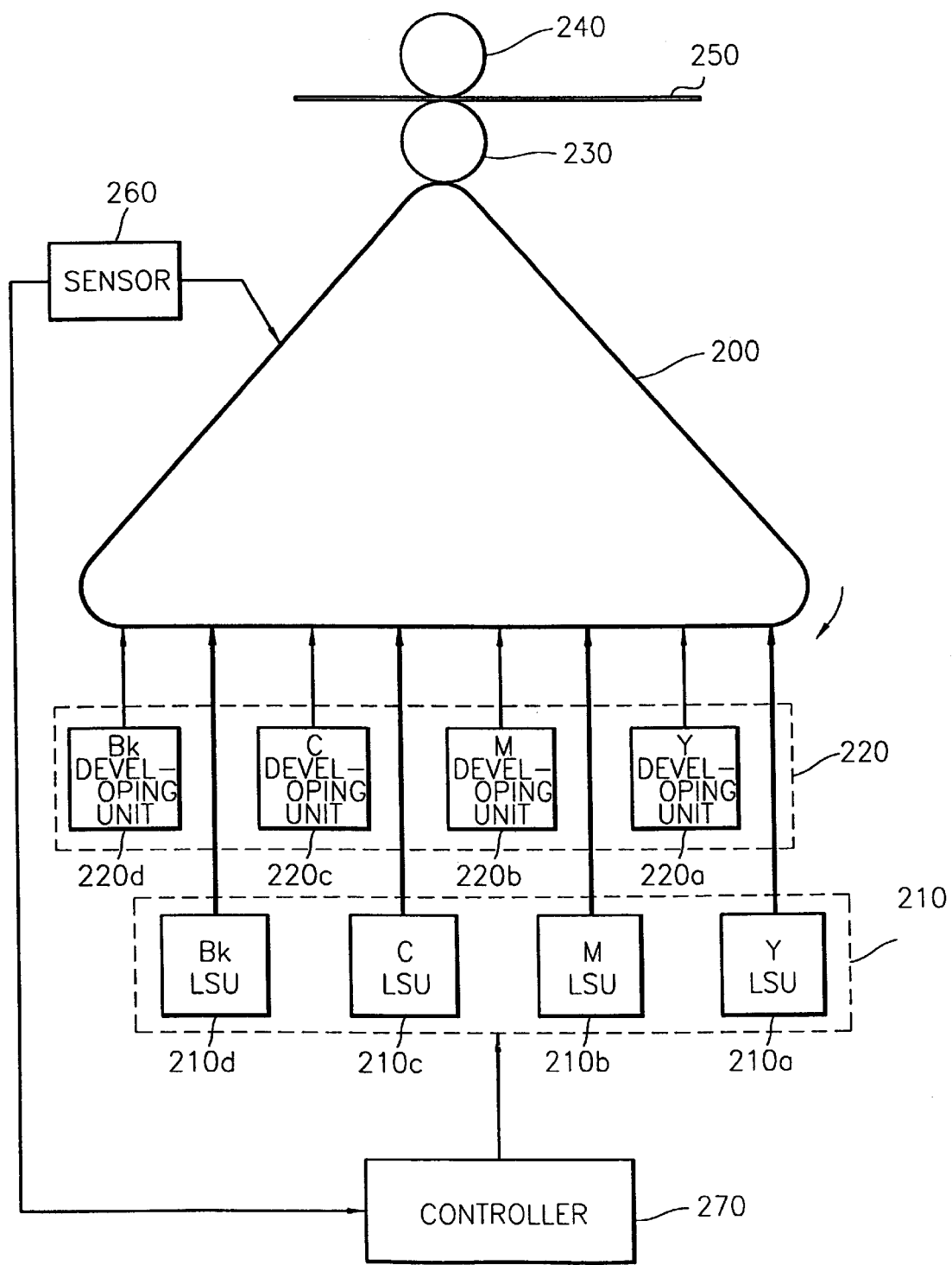
FIG. 2 is a diagram showing the configuration of an image forming apparatus according to the present invention.

Referring to FIG. 2, an image forming apparatus according to the present invention includes an exposing unit 210 for forming an electrostatic latent image on a photosensitive belt 200, a developing unit 220 for forming a toner image by supplying liquid toner to the electrostatic latent image, a sensor 260 for detecting the position of the toner image formed on the photosensitive belt 200, and a controller 270 for calculating a positional error by comparing the position of the toner image detected by the sensor 260 with the established reference position and for controlling the exposure of the exposing unit 210 based on the calculated positional error.

Figure 4:
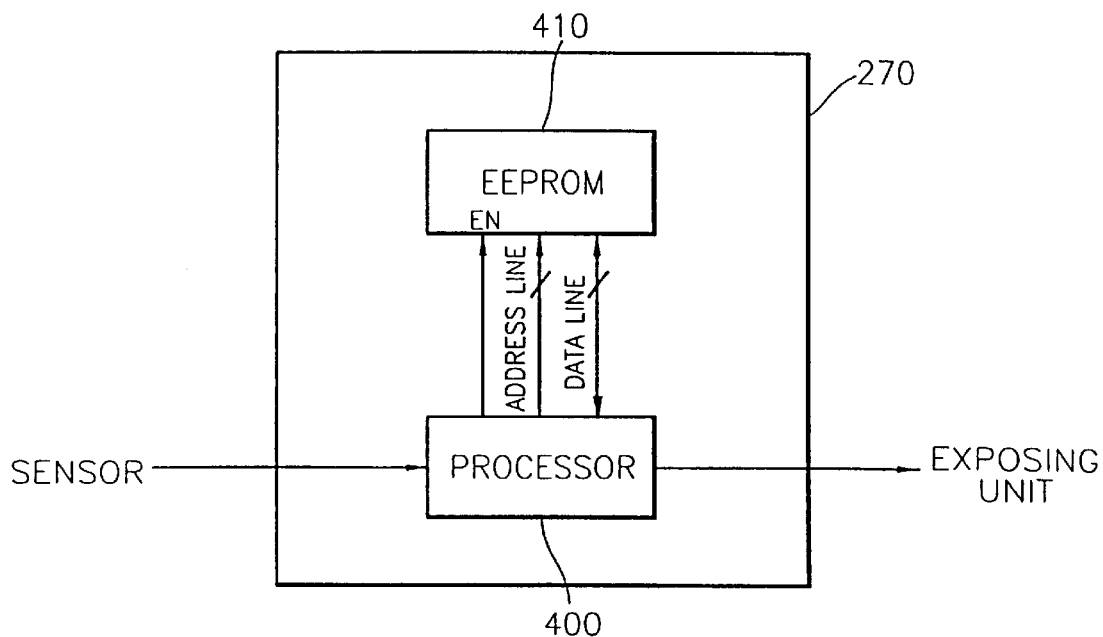
FIG. 4 is a block diagram showing the internal structure of the controller shown in FIGS. 2 and 3.

Referring to FIG. 4, the controller 270 is comprised of an EEPROM (electrically erasable programmable ROM) 410 which is a storing means and a processor 400. Alternatively, an EPROM or PROM (programmable ROM) can be used as the storing means.

An error which is a deviation value between the position of the toner image for each color detected by the sensor 260 (see FIG. 2) and the position of the established reference is stored in the EEPROM 410. The EEPROM 410 receives a write command signal via a read/write port (not shown) from the processor 400 and the error data is written and stored according to the write command signal from the processor 400. Here, the EEPROM 410, which is enabled by a predetermined signal input from the processor 400 to an enable port "EN", receives designation of an address by the processor 400 via an address bus and receives error data from the processor 400 via a data bus. The error data stored as such is read by the processor 400 via the data bus according to a read command signal issued by the processor 400.

The processor 400 calculates an error which is a deviation value between the position of the image detected by the sensor 260 and the position of an established reference and stores the calculated error on the EEPROM 410. The processor 400 reads the stored error when necessary and generates a control signal to perform corrected exposure to the exposing unit 210 (i.e., an exposure controller for controlling the exposing unit).

Referring to FIG. 2, the exposing unit 210 is composed of laser scanning units (LSUs) 210a, 210b, 210c, and 210d for each color. Among the LSUs, a Y-LSU 210a is a laser scanning unit for yellow; a M-LSU 210b is a laser scanning unit for magenta; a C-LSU 210c is a laser scanning unit for cyan; and a BK-LSU 210d is a laser scanning unit for black. The developing unit 220 develops the liquid toner at the position of the electrostatic latent image formed by the exposing unit 210 and is comprised of developing units 220a, 220b, 220c, and 220d for each color.

The operation of the image forming apparatus having the above structure to correct a scanning position is as follows.

First, the Y-LSU 210a of the exposing unit 210 performs exposure on an image area on the photosensitive belt 200 according to a predetermined clock signal and a control signal transmitted from the exposure controller (not shown). The Y-developing unit 220a develops the liquid toner of yellow on the electrostatic latent image formed on the photosensitive belt 200.

Next, the M-LSU 210b performs exposure at a position spaced apart by a predetermined distance from the position where the liquid toner of yellow is developed. The M developing unit 220b develops liquid toner of magenta on the position on which exposure is performed by the M-LSU 210b.

Next, the C-LSU 210c performs exposure at a position spaced apart a predetermined distance from the position where the liquid toner of magenta is developed. The C developing unit 220c develops liquid toner of cyan on the position on which exposure is performed by the C-LSU 210c.

Finally, the BK-LSU 210d performs exposure at a position spaced apart a predetermined distance from the position where the liquid toner of cyan is developed. The BK developing unit 220d develops liquid toner of black on the position on which exposure is performed by the BK-LSU 210d.

As described in the foregoing, when the exposure and development are performed by the respective LSUs and the developing units for each color, toner images for each color are formed on the photosensitive belt 200. Here, the toner images for each color are formed based on the input of an image pattern which is arbitrarily set to correct the scanning position and the distance between the toner images for each color is determined by the image pattern. After the toner images are formed on the photosensitive belt 200, the images are printed on a print paper 250 by a transfer roller 230 and a heated press roller 240".

Figure 5:
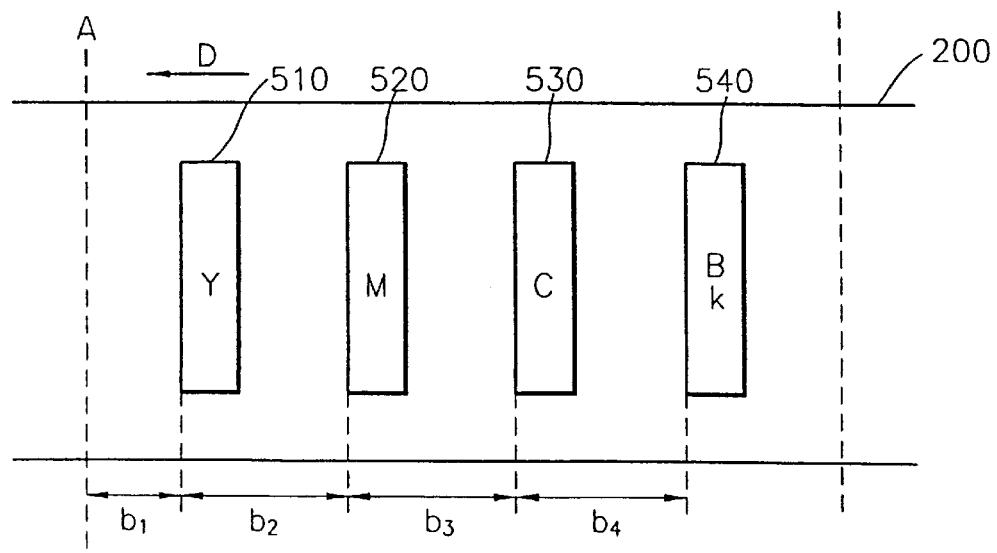
FIG. 5 is a view showing the position of the toner image for each color formed on the photosensitive belt of FIG. 2.

FIG. 5 shows the toner images for each color formed by the image pattern on the photosensitive belt 200. Here, the photosensitive belt 200 operates in a direction indicated by arrow "D" and the dashed lines indicate an initial position of the image area on the photosensitive belt 200.

As shown in the drawing, a toner image 510 of yellow is formed apart from the initial position of an image by distance $b_1$; a toner image 520 of magenta is formed apart from the yellow image 510 by distance $b_2$; a toner image 530 of cyan is formed apart from the magenta image 520 by distance $b_3$; and a toner image 540 of black is formed apart from the cyan image 530 by distance $b_4$.

When the image areas of the above toner images for each color formed on the photosensitive belt with equal intervals arrive at a particular position, the sensor 260 detects the distance between the toner images for each color. For that purpose, the sensor 260 detects the initial position "A" of the image, and if the position A is detected, the sensor 260 detects the distance $b_1$ between the initial position A of the image and the position of the yellow toner image "Y", the distance $b_2$ between the position of the yellow toner image "Y" and the position of the magenta toner image "M", the distance $b_3$ between the position of the magenta toner image "M" and the position of the cyan toner image "C", and the distance $b_4$ between the position of the cyan toner image "C" and the position of the black toner image "Bk".

Position data of the toner images for each color detected by the sensor 260 is input to the processor 400 in the controller 270. Distance data of the toner images for each color according to the previously set image pattern is input to the processor 400. When the data of the distances between the toner images for each color according to the image pattern is input, the processor 400 compares the distance data with the data of the positions of the toner images for each color input by the sensor 260 to calculate a positional error that is a deviation between the two data. For instance, $a_1$, $a_2$, $a_3$ and $a_4$ are input as the data of the distance between the toner images for each color according to the image pattern and the data of the position of the toner image for each color input by the sensor 260 are $b_1$, $b_2$, $b_3$ and $b_4$, the positional error calculated by the processor 400 are $a_1-b_1=c_1$, $a_2-b_2=c_2$, $a_3-b_3=c_3$ and $a_4-b_4=c_4$ according to each color. When the positional errors $c_1$, $c_2$, $c_3$ and $c_4$ for each color are calculated as above, the processor 400 enables the EEPROM 410 and inputs a write command signal via the read/write port. Also, the processor 400 designates the address through an address line and inputs the positional error data $c_1$, $c_2$, $c_3$ and $c_4$ through a data line to be stored in a designated address area. Then, the positional error data $c_1$, $c_2$, $c_3$ and $c_4$ are stored in the EEPROM 410.

Thereafter, when a command to perform printing is input, the processor 400 inputs a scanning command to the exposing unit 210 and reads the positional error data $c_1$, $c_2$, $c_3$ and $c_4$ stored in the EPROM 410. Next, the processor 400 inputs the read positional error data $c_1$, $c_2$, $c_3$ and $c_4$ to the exposing unit 210 and adds or subtracts the positional error data $c_1$, $c_2$, $c_3$ and $c_4$ to or from the established reference scanning position to perform exposure in which the positional error is corrected.

Figure 3:
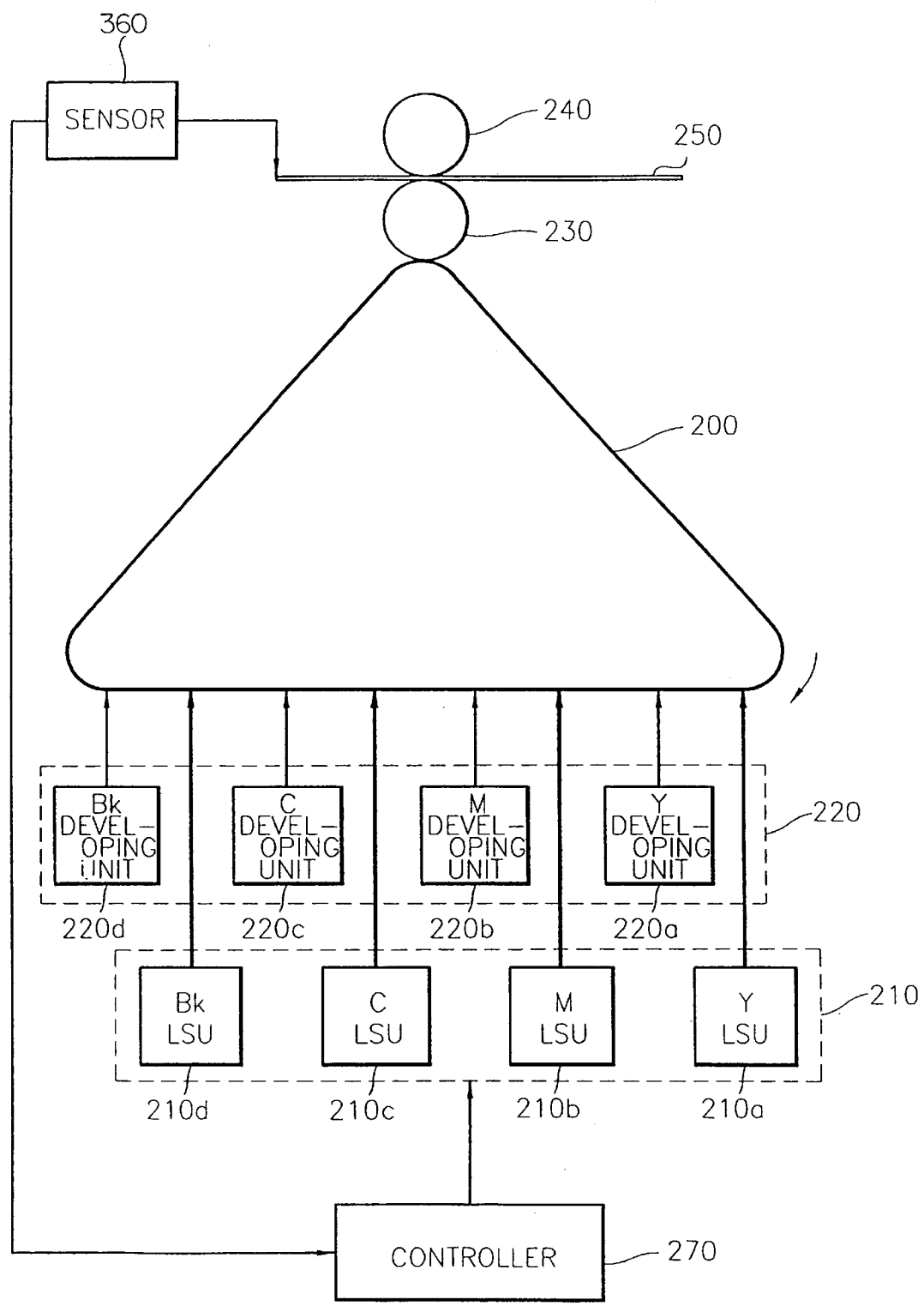
FIG. 3 is a diagram showing the configuration of an image forming apparatus according to another preferred embodiment of the present invention.

FIG. 3 shows another preferred embodiment of the image forming apparatus according to the present invention. Here, since the same reference numerals as shown in FIG. 2 indicate the same elements, a description thereof will be omitted.

Referring to FIG. 3, in this embodiment a sensor 360 for detecting the position of an image for each color formed through scanning does not detect the position of a toner image for each color formed on the photosensitive belt 200 but, instead, the position of an image for each color printed on a print paper 250 that is output. Thus, by installing the sensor 360 in the vicinity of a paper output portion (not shown), the sensor 360 can be more easily and conveniently checked and replaced than when installed around the photosensitive belt 200.

When the position of an image for each color is detected by the sensor 360, the detected positional error data is input to the processor 400 in the controller 270. Subsequent steps are the same as in the above description.

As described above, in the image forming apparatus according to the present invention, since errors between the established scanning position and the actual scanning position are automatically corrected during scanning, the scanning can be performed more precisely and conveniently than scanning with manual correction according to the conventional technology.

It is noted that the present invention is not limited to the preferred embodiment described above, and it is apparent that variations and modifications by those skilled in the art can be effected within the spirit and scope of the present invention defined in the appended claims.

What is claimed is:

1. An image forming apparatus comprising:

an exposing unit for performing exposure by scanning beams onto a photosensitive belt to form electrostatic latent images, said photosensitive belt containing an image area;

a developing unit for forming toner images by supplying toner to the electrostatic latent images formed by said exposing unit;

a sensor for detecting a first distance between a particular position of said image area on said photosensitive belt and a first of said toner images, and for detecting respective distances between said toner images;

a controller for calculating positional errors by comparing said first distance and said respective distances with established reference positions and controlling exposure performed by said exposing unit through correcting the positions of the beams based on the calculated positional error.

2. An image forming apparatus comprising:

an exposing unit for performing exposure by scanning beams onto a photosensitive belt to form electrostatic latent images;

a developing unit for forming toner images by supplying toner to the electrostatic latent images formed by said exposing unit;

a printing unit for applying print images based on said toner images onto a print paper;

a sensor for detecting a first distance between a particular position of said print paper and a first of said print images, and for detecting respective distances between said print images;

a controller for calculating positional errors by comparing said first distance and said respective distances with established reference positions and controlling exposure performed by said exposing unit through correcting the positions of the beams based on the calculated positional error.

3. The image forming apparatus as claimed in claim 1 or 2, wherein said controller comprises:

a storing device for storing data of said positional error; and a processor for calculating said positional error and inputting the calculated positional error to said storing device, generating a control signal to output said positional error during printing, generating a control signal to perform exposure which corrects said positional error of the beam; and outputting said control signal to said exposing unit.

4. The image forming apparatus as claimed in claim 3, wherein said storing device is an EEPROM.

5. A method for forming an image comprising:

exposing a photosensitive belt through scanning beams to form electrostatic latent images on an image area of said photosensitive belt;

supplying toner to the electrostatic latent images formed by said exposing unit to develop toner images;

detecting a first distance between a particular position of said image area on said photosensitive belt and a first of said toner images, and detecting respective distances between said toner images;

comparing said first distance and said respective distances with predetermined reference positions and providing a result;

calculating a positional error based on the result provided in said comparing step; and correcting a position of the beam based on the calculated positional error.

6. A method for forming a print image to be printed onto print paper comprising:

exposing a photosensitive belt through scanning beams to form electrostatic latent images;

supplying toner to the electrostatic latent images formed by said exposing unit to develop toner images;

printing print images based on the toner images onto a print paper;

detecting a first distance between a particular position of said print paper and a first of said print images of the print paper and detecting respective distances between said print images;

comparing said first distance and said respective distances with predetermined reference positions and providing a result;

calculating a positional error based on the result provided in said comparing step; and correcting a position of the beam based on the calculated positional error.

* * * * *